July 14, 1942.
R. P. HEUER
2,289,911
REFRACTORY BRICK STRUCTURE
Filed Nov. 3, 1938
4 Sheets-Sheet 1
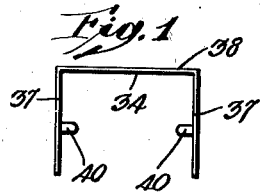
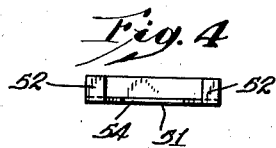
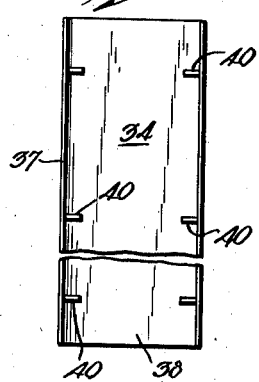
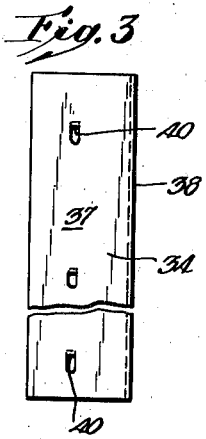
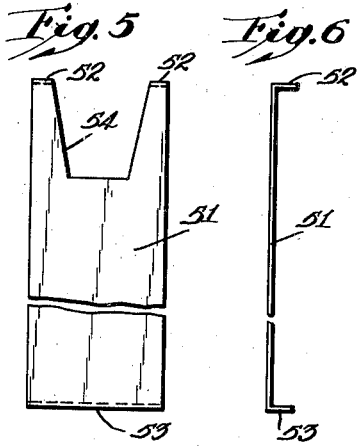
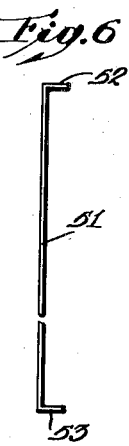
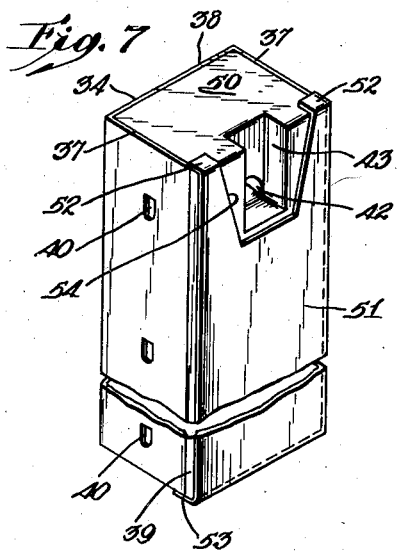
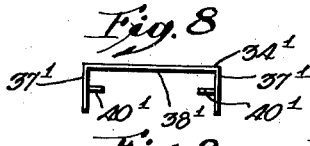
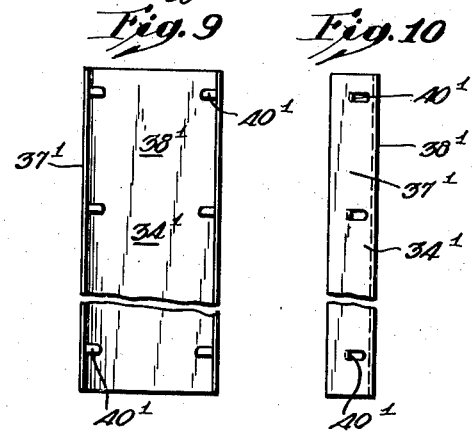
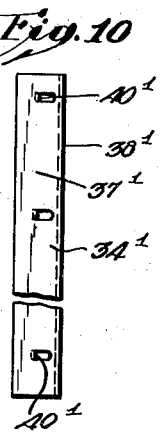
Inventor
Russell P. Heuer
by Stall Johnson and Son
Attorneys.
Witnesses:

July 14, 1942.       R. P. HEUER       2,289,911
REFRACTORY BRICK STRUCTURE
Filed Nov. 3, 1938       4 Sheets-Sheet 2
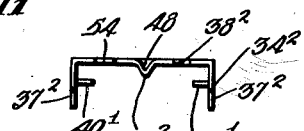
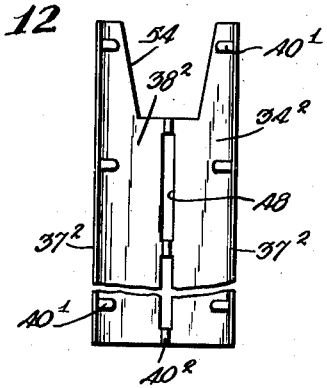
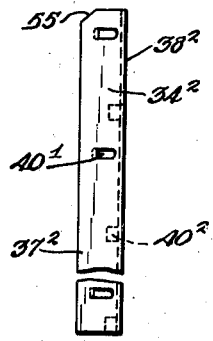
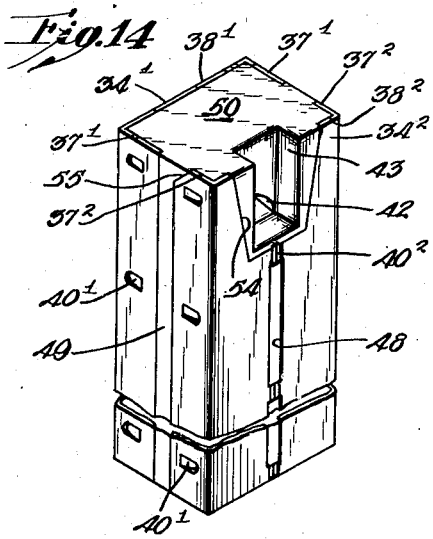
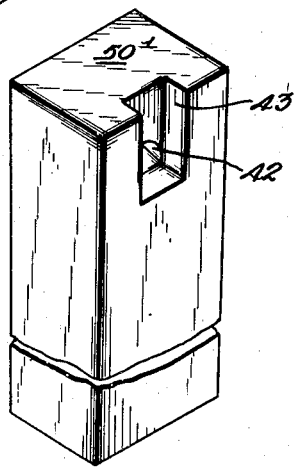
Inventor
Russell P. Heuer
Attorneys.

July 14, 1942.  R. P. HEUER  2,289,911
REFRACTORY BRICK STRUCTURE
Filed Nov. 3, 1938    4 Sheets-Sheet 3
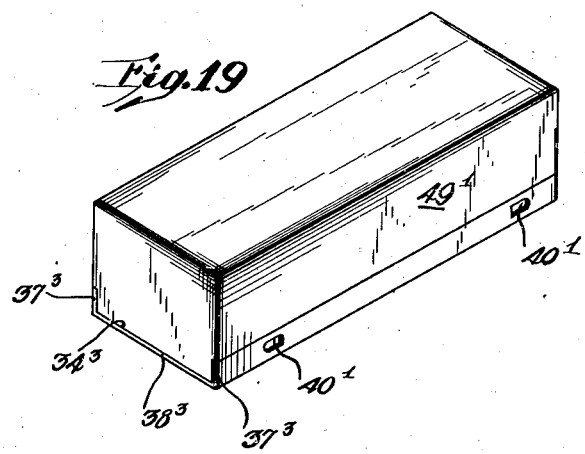
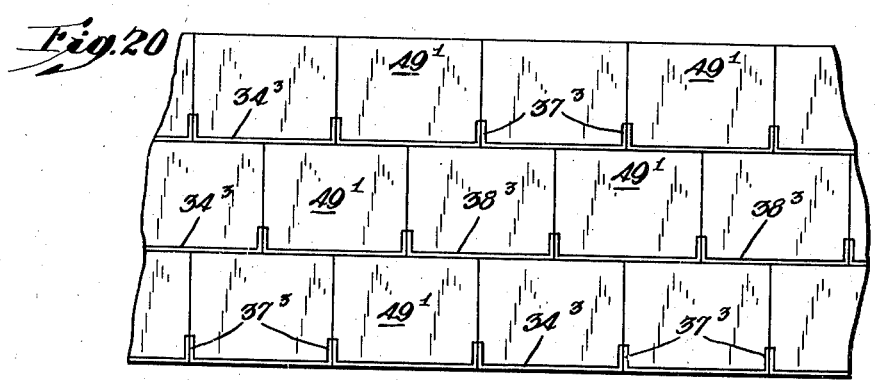
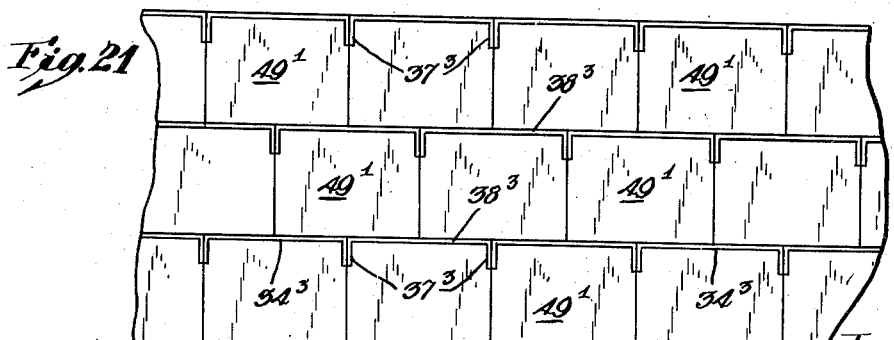
Witnesses:
Inventor
Russell P. Heuer
by Attorneys.

July 14, 1942. R. P. HEUER 2,289,911
REFRACTORY BRICK STRUCTURE
Filed Nov. 3, 1938 4 Sheets-Sheet 4

Witnesses:
Inventor
Russell P. Heuer
by Attorneys.

Patented July 14, 1942

2,289,911

UNITED STATES PATENT OFFICE 2,289,911

REFRACTORY BRICK STRUCTURE

Russell P. Heuer, Bryn Mawr, Pa., assignor to General Refractories Company, a corporation of Pennsylvania Application November 3, 1938, Serial No. 238,505

15 Claims. (Cl. 72—101)

The invention relates to basic brick provided with spacer plates and intended for use in basic suspended furnace roofs or walls and also to the suspended furnace roofs and walls produced.

The present application is a continuation in part of my U. S. application Serial No. 198,426, filed March 28, 1938, for Refractory brick process, now Patent 2,247,376.

A purpose of the invention is to mold brick by direct pressure against a lateral face and, concurrently with the molding, fasten oxidizable metallic spacers on a lateral face or faces of the brick.

A further purpose is to apply to a brick a U-shaped oxidizable metallic spacer which covers the preponderant part of one face and parts of two other adjoining faces of the brick, embedding interlocking projections or tabs from the spacer in the brick as the brick is molded.

A further purpose is longitudinally to weaken a spacer plate which is in contact with one of the dies of a brick molding press to permit lateral pressure adjustment and, where a slot is used, to allow the escape of air from the brick during molding.

A further purpose is to form a brick with substantial parts of three lateral faces covered by an oxidizable metallic spacer plate applied during molding, and to cover the fourth side by an oxidizable metallic spacer plate applied subsequent to molding and desirably held in place by resilient prongs engaging the ends of the brick.

A further purpose is to slot a U-shaped oxidizable metallic spacer plate longitudinally of the base of the U, leaving connecting prongs, to divert the connecting prongs into the interior of the U and to embed the connecting prongs in the brick during molding.

A further purpose is to hold a U-shaped oxidizable metallic spacer plate by embedding projections from the sides of the U in the brick during molding.

A further purpose is to build up a basic suspended furnace roof by alternately hanging oxidizable-metal-clad basic refractory bricks and unclad basic refractory bricks, the clad bricks preferably having substantial portions of all four sides covered by spacer plates.

A further purpose is to employ, in a basic suspended furnace roof, bricks having spacer plates on all four sides alternately with tapered bricks free from spacer plates, the taper allowing for growth of the spacer plates near the hot ends due to oxidation while protecting against excessive lateral pressures.

A further purpose is to construct a wall from brick of the present invention, desirably having an oxidizable metallic spacer plate molded as part of the brick substantially covering one horizontal face only and parts of two adjoining lateral faces.

A further purpose is to employ an oxidizable metallic spacer plate on a horizontal face of a wall brick while leaving portions of vertical faces of adjoining wall bricks unprovided with oxidizable metallic spacer plates and therefore better equipped to impede melting out of the spacer plate.

Further purposes appear in the specification and in the claims.

The drawings illustrate a few of the many possible embodiments of the invention, the forms shown being selected from the standpoints of convenience in illustration and satisfactory explanation of the principles involved.

Figures 1, 2 and 3 are respectively top plan, front elevation and side elevation views of a U-shaped spacer plate as employed in the present invention.

Figures 4, 5 and 6 are respectively top plan, front elevation and side elevation views of a spacer plate which may be applied to the brick after molding.

Figure 7 is a perspective view of a completely molded basic suspended roof brick of the invention.

Figures 8, 9 and 10 are respectively top plan, front elevation, and side elevation views of a variant form of U-shaped spacer plate.

Figures 11, 12 and 13 are respectively top plan, front elevation and side elevation views of a U-shaped spacer plate which may be used with the spacer plate of Figures 8, 9 and 10.

Figure 14 is a perspective view of a completed brick using the spacer plates of Figures 8 to 13.

Figure 15 is a perspective view of a tapered unclad brick which desirably alternates with the brick of Figures 7 or 14 in the suspended roof.

Figure 17:
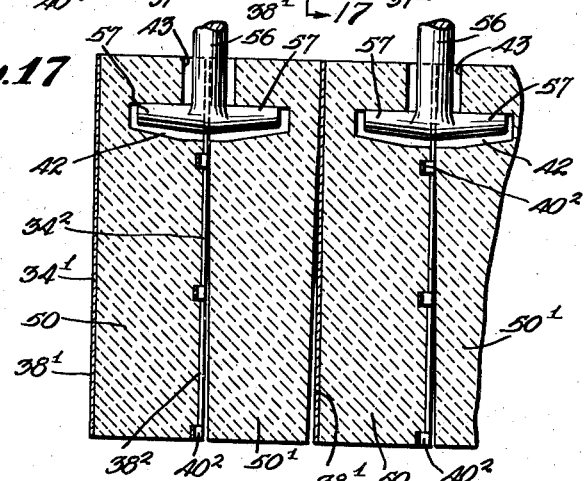
Figure 17 is a section of Figure 16 on the line 17—17, showing the roof after hanging but before oxidation has caused growth of the lower ends of the spacer plates.
Figure 18:
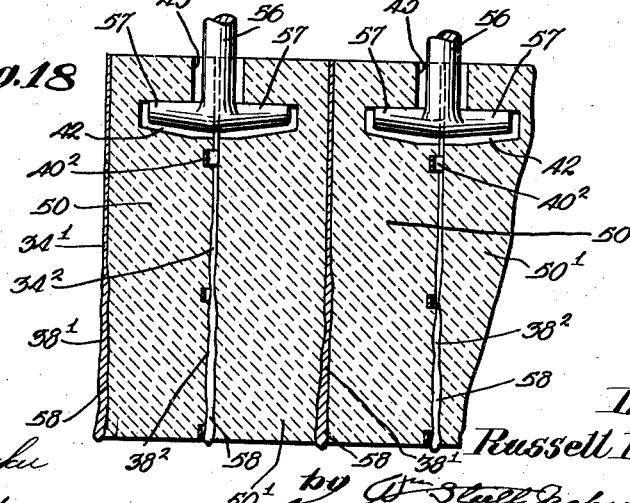

Figure 18 corresponds to Figure 17 and shows the spacer plates after they have oxidized some distance back of the hot face.

Figure 19 is a perspective view of a wall brick embodying the present invention.

Figures 20 and 21 are alternative wall constructions using the wall brick of Figure 19.

In the drawings like numerals refer to like parts.

As explained in Russell Pearce Heuer U. S. Patent No. 2,154,813, granted April 18, 1939, for Suspended furnace roof, very effective suspended furnace roofs can be obtained by hanging basic refractory bricks side by side and interspersing oxidizable metallic spacer plates between the bricks. The spacers oxidize near the hot face of the roof and ordinarily for some distance back of the hot face. As the oxide occupies a greater volume than the original spacer metal, growth of the spacers results from the oxidation and the spacer oxide rigidly unites with the adjoining faces of the bricks, exerts a mild lateral pressure on the bricks, and seals the joints between the bricks. Whereas before growth the bricks and the spacers are usually relatively loosely associated and the individual bricks and spacers are capable of adjusting their relative positions as the furnace heats up, the oxidation of the spacers causes integration of the roof or of large units of the roof.

In construction of basic suspended furnace roofs of the type referred to, certain difficulties have been encountered. The separate operation of applying the individual spacer plates to the preformed bricks during construction of the roof has resulted in increased labor cost of building the roof.

In the previously constructions there has not always been close conformity between the brick and the spacer plate, due in some cases to irregularities in the brick and in other cases to unintentional bending of the spacer plate prior to or during assembly of the roof.

On an experimental basis, the present inventor has attempted to attach the plates physically to the premolded brick by adhesive or by resiliently gripping the brick by the plate. This has not in all cases been fully satisfactory because in the assembly of the roof there have been points where the spacer plate on one brick contacts the spacer plate of an adjoining brick instead of being in contact with the lateral face of the adjoining brick. Thus after oxidation, in order to integrate the roof, there must be not only coalescence between the brick and the plate but also welding or coalescence between two plates. The extra spacer plate thickness increases the danger that the plates will melt out rather than oxidize, since in many of the furnaces employing the roofs of the present invention such as open hearth steel furnaces, the operating temperature of the furnace is above the melting point of the iron or steel spacers. Furthermore separate application of many spacer plates to premolded bricks is cumbersome, and not always very effective.

In accordance with the present invention, the spacer plate or plates will not in most cases be applied to a preformed or premolded brick as in Patent No. 2,154,813 aforesaid, but the spacer plate or plates will be formed as part of the brick at the time of molding the brick. Applicant will not, however, pack in the refractory through the ends of a closed casing as in Maccallum U. S. Patent No. 1,106,725, granted August 11, 1914, for Furnace wall construction. This patent discloses a brick not suitable for and never applied to suspended furnace roofs.

In accordance with the present invention, the spacer plate acts with the die for the purpose of molding the brick, and is secured to the brick during molding as by suitable interlocking means embedded in the brick.

While the best use of the invention will probably be in basic suspended furnace roofs, certain aspects of the invention are applicable in furnace walls, as later explained.

This method of molding by applying pressure through the spacer plate itself assures absence of voids between the spacer plate and the brick, gives uniform pressure distribution, produces a smooth brick surface and very firmly unites the spacer plate to the brick.

The process of making the brick of the present invention is described in my U. S. Patent No. 2,247,376, granted July 1, 1941, for Refractory brick process, which is incorporated herein by reference.

The brick mix employed may, for example, be magnesia as described in Heuer application Serial No. 707,084 aforesaid, or as described in Russell Pearce Heuer U. S. Patent No. 1,859,512, granted May 24, 1932, for Refractory and method of making it, or in U. S. Patent No. 1,992,482, granted February 26, 1935, for High-pressure brick containing magnesia and process of making the same. On the other hand, a chrome brick mix may be employed as described in Russell Pearce Heuer U. S. Patent No. 1,992,483, granted February 26, 1935, for High-pressure chrome refractory. Chrome-magnesia brick may be employed as described in Russell Pearce Heuer U. S. Patent No. 2,087,107, granted July 13, 1937, for Chrome magnesia refractory and method or Patent No. 2,155,165, granted April 18, 1939, for Furnace roof. As the present invention is not primarily concerned with the composition of the refractory mix, which is fully disclosed in the other applications referred to above, the disclosure of said prior applications and patents is incorporated herein by reference and made a part hereof, and will be found to disclose the preparation of the brick mix, the suitable molding pressure and other pertinent information.

Where the term brick is used herein, it will be understood that any suitable block or other shape is intended, provided with any special contour desired to engage the particular type of hanger.

A spacer plate 34 (Figures 1 to 3) of generally U-shape has arms 37 and a base 38 of the U. The arms 37 are desirably not as long as the width of the side of the brick, so that a portion 39 of the side of the brick is not covered by the spacer plate (Figure 7).

Projections or tabs 40 punched out and bent inwardly from the spacer plate are embedded in the brick during molding.

The hook engaging depression 42 and hanger slot 43 are also forming during molding.

Figures 1 to 4 show in greater detail the U-shaped spacer plate of Figures 1 to 4. This spacer plate of Figures 1, 2 and 3 is shown applied to the brick 50 in Figure 7. The base 38 of the U preferably is applied to the rear lateral face of the brick 50, with the arms 37 of the U applied to the side faces of the brick. The interlocking tabs 40 punched out and bent inwardly from the spacer plate are embedded in the side faces of the brick as indicated in Figure 7.

As molded, the brick of Figure 7 has a front face unprovided with a spacer plate. This is covered by a spacer plate 51 shown in Figures 4 to 6 having resilient prongs at 52 at the top and 53 at the bottom which engage over the upper and lower end faces of the brick (Figure 7). A slot 54 near the upper end of the spacer plate 51 is cut as shown to admit the hanger to the hanger recess, later described. The feature of the resilient engagement of the prongs 52 and 53 with the brick is claimed in Patent No. 2,155,165 aforesaid.

The preferable construction of suspended furnace roof brick is that indicated in Figure 14. The rear spacer plate 34' for this brick is shown in Figures 8 to 10, in which the base 38' of the U engages the rear face of the brick 50 and the arms 37' of the U engage portions of the sides of the brick as shown in Figure 14. Interlocking projections 40' formed from the arms are embedded in the sides of the brick. In some cases the interlocking projections may extend generally horizontal when the brick is suspended as in the construction of Figures 1 to 3, but it is usually preferred to have these interlocking projections extend vertically when the brick is suspended as shown in Figures 8 to 13.

The spacer plate $34^2$ contacting the front face of the brick 50 is shown in Figures 11 to 13. The base $38^2$ of its U contacts the front face of the brick and has the usual cut away portion 54 for the hanger. The side arms $37^2$ of the U cover portions of the sides of the brick and have vertically extending interlocking projections 40' as shown in Figure 14, which are embedded in the sides of the brick. The interlocking projections $40^2$ connecting the sides of the slot 48 are seen embedded in the front face of the brick.

The weakening of the base of the U of the spacer plate, as shown in Figures 11 to 14, permits the spacer plate to adjust laterally during the molding operation and prevents kinking or bowing of the spacer plate, particularly the one which adjoins the movable die.

The preferred form of longitudinal weakening employs a slot 48 which runs longitudinally through the base 38 of the U of the spacer plate $34^2$, being interrupted at intervals for the cross connections between the two sides of the spacer plate. These cross connections bent inwardly form the interlocking projections $40^2$. It will be understood that the width of the base $38^2$ of the U in the spacer plate $34^2$ is adjusted somewhat during molding by change in the width of the slot 48 and by bending of the interlocking projections $40^2$.

The slot 48 also allows air to escape during molding, thus avoiding air entrapment. This feature of air release through the slot 48 or some equivalent opening is particularly important when using opposite spacer plates, as in Figure 14, although not of the same importance, when a single spacer plate is co-molded with the brick as in Figure 7.

The arms 37' and $37^2$ of the spacer plates 34' and $34^2$ are preferably shorter than the lateral dimensions of the side face of the brick, so that when the brick is compressed, the arms cannot meet and cause crushing or bending, even though there may be some variations in the charge of brick mix. A line of refractory 47 is ordinarily exposed at the side of the brick.

The upper corner of the side arm of the U is preferably cut away as seen at 55 in Figures 13 and 14 to avoid unduly stressing the brick corner during molding.

The brick 50 of Figure 7 or 14 is preferably assembled alternately with a brick 50' having no spacer plates, and shown in Figure 15. The brick 50' may have conventional uniform lateral faces, but it will preferably be tapered as illustrated from a maximum lateral dimension at the top to a minimum lateral dimension at the bottom. This taper allows for a certain growth of the oxidized spacers near the hot ends without exerting excessive pressure. The taper is not of course necessary. It has been found that a satisfactory taper is $\frac{1}{32}$ inch (0.079 centimeter) on each lateral face of a brick which is 3½ x 4½ inches (8.9 x 11.4 centimeters) at its larger end and 12, 15 or 18 inches (30.5, 38.1 and 45.7 centimeters) in length. When the taper is used, the workman can press the adjoining bricks hard against one another without danger that there will not be sufficient space allowed for growth near the hot face of the roof, but when no taper is used, the workman should not press the bricks hard together laterally.

Figure 16:
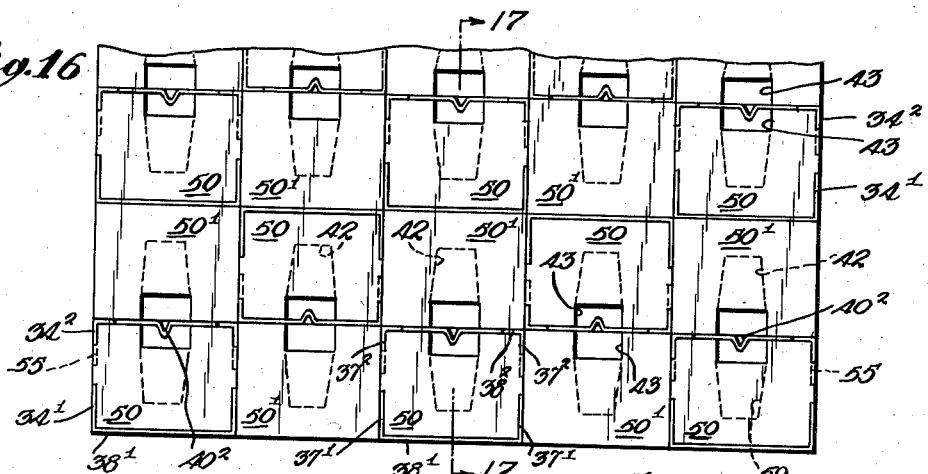
Figure 16 is a top plan view of a basic suspended furnace roof using bricks of the present invention, omitting the hangers for clearness in illustrating the spacer plates.

The assembled roof construction is shown in Figures 16 to 18. These figures show bricks 50 of the type of Figure 14 alternating with bricks 50' of the type of Figure 15. It will be understood that the encased bricks could be of any other suitable type, for example, that of Figure 7. Thus throughout the roof except at one edge each encased brick 50 is front to front, side to side and back to back against an unencased brick 50', so that there is no possibility that two thicknesses of spacer plates will intervene between the brick faces at any side. The hangers 56 are of course connected to the usual overhead structure (not shown), pass through hanger slots 43 of any suitable form, and have hooks 57 engaging in hanger recesses 42. Prior to oxidation of the spacers, the bricks are quite loose laterally, as shown in Figure 17, so that ordinarily an individual hanger and its associated bricks might be lifted out with the hand. This is an advantageous feature, as the individual bricks are free to move and adjust during the initial heating up of the furnace and thus prevent localized abnormal stresses upon individual bricks. It is only after the roof has been thoroughly heated at furnace temperature and oxidation has had its effect, that the individual bricks are integrated together.

After the oxidation has its effect, the spacers near the hot faces swell or grow as shown at 58 in Figure 18, not only filling the space left by the taper but exerting mild lateral pressure upon the bricks, forcing the spacer oxide into any recesses left in the bricks and combining or coalescing with the brick material. In the case of bricks comprising magnesia, whether as the preponderant ingredient or as a minor constituent in a chrome brick, the spacer oxide appears to combine with the magnesia to form magnesium ferrite which is quite refractory and volume stable. A further important effect is that the growth of the spacers compensates for shrinkage of the bricks. This is of special importance where, as will usually be the case, the bricks are unfired and are subjected to furnace temperature for the first time when the furnace is heated up.

The roof may or may not have lateral structural boundaries as explained in prior patents, such as Nos. 2,154,813 and 2,155,165 aforesaid, since the effect of gravity upon adjacent bricks will tend to maintain them vertical.

Of course the spacers must not collapse laterally, and for that reason it would be undesirable the brick, the brick making a molded union with the tabs.

5. A basic refractory brick having lateral faces, a U-shaped oxidizable metallic spacer plate having a base which covers the preponderant part of one lateral face of the brick and arms which cover at least portions of two other lateral faces of the brick, the spacer plate being in molded conformity with the brick, and tabs bent inwardly from the arms of the U-shaped spacer plate and making a molded union with the brick.

6. A basic refractory brick having lateral faces and a recess in one face near the upper end for engaging a hanger and a U-shaped oxidizable metallic spacer covering the preponderant part of one lateral face and at least parts of each of two other lateral faces, the spacer plate being in molded conformity with the brick, and having interlocking projections embedded in the brick, the brick making a molded union with the projections.

7. A basic refractory brick having lateral faces and a pair of U-shaped oxidizable metallic spacer plates each covering the preponderant part of one lateral face and at least a part of each of the two other lateral faces of the same brick, the spacer plates being in molded conformity with the brick, and each spacer plate making molded union with the brick.

8. A basic refractory brick having lateral faces, a pair of U-shaped oxidizable metallic spacer plates, each having a base covering the preponderant part of one lateral face and each having arms which cover at least parts of two other lateral faces of the same brick, the spacer plates being in molded conformity with the brick, and tabs bent inwardly from the spacer plates and embedded in the brick, the brick making a molded union with the tabs.

9. A basic refractory brick having lateral faces, a pair of U-shaped oxidizable metallic spacer plates, each having a base covering the preponderant part of one lateral face and each having arms which cover at least parts of two other lateral faces of the same brick, the spacer plates being in molded conformity with the brick, and tabs bent inwardly from the arms of the spacer plates and embedded in the brick, the brick making a molded union with the tabs.

10. A suspended furnace roof basic refractory brick having lateral faces and having a hanger recess near the top of one lateral face, a U-shaped oxidizable metallic spacer plate having a base covering the preponderant part of the rear of the brick and having arms covering at least a part of each of the sides of the brick with inward projections on the arms, the spacer plate being in molded conformity with the brick, and means for structurally interlocking each of said projections with the brick by refractory making molded union with the projections.

11. A basic refractory brick having lateral faces, an oxidizable metallic spacer plate covering a preponderant part of one of the faces and having a slot extending longitudinally for the major part of the length of the brick and means embedded in the brick and making molded union with the refractory for interlocking the spacer plate with the brick.

12. A basic refractory brick having lateral faces, an oxidizable metallic spacer covering the preponderant part of one of the lateral faces and weakened longitudinally of the face and interlocking projections from the spacer plate embedded in the brick by refractory making molded union with the projections.

13. A basic suspended refractory brick having lateral faces, a U-shaped oxidizable metallic spacer having the base of the U covering the preponderant part of one of the faces and the arms of the U covering at least parts of other faces, interlocking projections from the arms of the U embedded in the brick and means for weakening the spacer plate longitudinally of the base of the U.

14. A basic suspended refractory brick having lateral faces, a U-shaped oxidizable metallic spacer having the base of the U covering the preponderant part of one of the faces and the arms of the U covering at least parts of other faces, interlocking projections from the arms of the U embedded in the brick, means for weakening the spacer plates longitudinally of the base of the U and interlocking projections along the line of weakening embedded in the brick and making molded union with the brick.

15. A basic refractory brick comprising a densely compacted mass of basic refractory particles and a U-shaped oxidizable metallic spacer plate making a molded union with the refractory, the base of the U covering a preponderant part of one face of the brick and the arms of the U covering at least parts of each of two other faces of the brick, the spacer plate being in molded conformity with the brick.

RUSSELL P. HEUER.